United States Patent
Suzuki et al.

(10) Patent No.: US 8,043,738 B2
(45) Date of Patent: Oct. 25, 2011

(54) LIQUID ACTION SUBSTANCE BATTERY

(75) Inventors: Masami Suzuki, Kanagawa (JP);
Muneto Hayami, Kanagawa (JP); Koji Kano, Gunma (JP); Kazuo Udagawa, Tokyo (JP)

(73) Assignee: Toshiba Battery Co., Ltd., Tokyo (JP)

( * ) Notice: Subject to any disclaimer, the term of this patent is extended or adjusted under 35 U.S.C. 154(b) by 1034 days.

(21) Appl. No.: 10/599,715

(22) PCT Filed: Apr. 5, 2005

(86) PCT No.: PCT/JP2005/006997
§ 371 (c)(1),
(2), (4) Date: Jul. 23, 2007

(87) PCT Pub. No.: WO2005/099004
PCT Pub. Date: Oct. 20, 2005

(65) Prior Publication Data
US 2008/0003497 A1     Jan. 3, 2008

(30) Foreign Application Priority Data

Apr. 8, 2004   (JP) ................. 2004-114358

(51) Int. Cl.
*H01M 6/14* (2006.01)
*H01M 2/26* (2006.01)
*H01M 2/12* (2006.01)
*H01M 2/30* (2006.01)

(52) U.S. Cl. .......... 429/101; 429/56; 429/161; 429/178
(58) Field of Classification Search .............. None
See application file for complete search history.

(56) References Cited

U.S. PATENT DOCUMENTS

| 3,518,127 A | 6/1970 | Aronson |
| 5,354,628 A * | 10/1994 | Watanabe et al. ............... 429/56 |
| 6,555,265 B1 | 4/2003 | Fleming et al. |
| 2003/0232238 A1 | 12/2003 | Fleming et al. |

FOREIGN PATENT DOCUMENTS

| JP | 6 20704 | 1/1994 |
| WO | WO 01/78166 A1 | 10/2001 |

OTHER PUBLICATIONS

Machine translation of JP 6-20704, Jan. 1994.*
U.S. Appl. No. 11/576,290, filed Mar. 29, 2007, Suzuki, et al.
U.S. Appl. No. 11/720,364, filed May 29, 2007, Suzuki, et al.

* cited by examiner

*Primary Examiner* — Jonathan Crepeau
(74) *Attorney, Agent, or Firm* — Oblon, Spivak, McClelland, Maier & Neustadt, L.L.P.

(57) ABSTRACT

A liquid action substance battery having its external terminal welded after assembling the battery in which safety of the battery is enhanced by protecting an explosion-proof valve against being torn apart in the subsequent welding work of the external terminal even if the position of a negative pole action substance being press-bonded to the inner surface of the battery can is shifted and that substance is extruded to the bottom face of the battery can. The liquid action substance battery employing an alkaline metal such as lithium, sodium or potassium or its alloy as the negative pole action substance, and an oxyhalide such as thionyl chloride, sulfuryl chloride or phosphoryl chloride in a liquid state at normal temperature as the positive pole action substance, and storing and sealing the negative pole action substance and the positive pole action substance in the bottomed battery, wherein a metal plate is welded to the inner surface at the bottom part of the battery can to form a partial space between them so that welding heat is not transmitted directly to the negative pole action substance when the external terminal is welded.

2 Claims, 5 Drawing Sheets the welding position of the negative pole external terminal the welding position of the negative pole external terminal the welding position of the negative pole external terminal the welding position of the negative pole external terminal the welding position of the negative pole external terminal the welding position of the negative pole external terminal

LIQUID ACTION SUBSTANCE BATTERY

FIELD OF THE INVENTION

The invention relates to a liquid action substance battery employing a liquid action substance doubled as an electrolyte, and more particularly enhancing the safety of works while welding an external terminal to the battery can.

BACKGROUND OF THE INVENTION

A liquid action substance battery employing an alkaline metal such as lithium, sodium or potassium, or its alloy as the negative pole action substance and oxyhalide such as thionyl chloride, sulfuryl chloride or phosphoryl chloride in a liquid state at normal temperature as the positive pole action substance, is commonly used, for example as a backup power source for a memory used in various industrial equipments, for its characteristics of large energy density, of excellent storage capacity and of availability over wide range of temperature.

In this battery, the negative pole action substance consisting of alkaline metals or its alloys is generally press-bonded to the inner surface of the can doubled as a negative pole terminal, and the positive pole substance mainly consisting of porous carbon is mounted in the can with a separator theirbetween. The liquid action substance mainly consisting of said oxyhalid, which is a positive pole action substance doubled as an electrolyte, is stored in the can. In addition, said positive pole substance is consisted of porous carbon and positive pole current collector such as metallic mesh or metallic rod.

In the liquid action substance battery as mentioned above, the negative pole action substance directly contacts with the positive pole action substance. However, since a protective coating which is chemical reaction products (alkaline metal halide salt such as lithium chloride) between the negative pole action substance and the positive pole action substance or electrolyte melted in the substance, is formed on the surface of the negative pole action substance, accordingly said coating could prevent direct reaction between the negative pole action substance and the liquid positive pole action substance doubled as electrolyte, and could prevent from self-discharging of the battery as well, and therefore it contributes to keep the battery safe, for example by preventing from heat generating.

In other side, these batteries are usually connected to the external terminals or connectors for their use, accordingly the external terminals or leading foils are commonly welded to the bottom face or top face of the battery, for example by spot welding.

However, in case that welding heat is directly transmitted to the negative pole action substance while welding of the external terminal to the bottom face of the battery can, the negative pole action substance might be melted. Accordingly it can't keep separate the negative pole action substance against the positive pole action substance by mean of the protective coating covered over the surface of said negative pole action substance. Then the negative pole action substance immediately reacts with the positive pole action substance in the cell, thereby inner pressure in the cell being increased, accordingly the explosion-proof valve consisting of cross-like thin plates placed on the bottom of the can happen to be torn apart.

In order to avoid such risk as mentioned above occurred in welding the external terminal to the bottom surface of the can, the position of the welding of the external terminal on the bottom surface of the can has been commonly shifted to the near center of the bottom surface, not to the peripheral part of the bottom surface of the can where the negative pole action substance is located nearby.

However, in case that press-bonding position of the negative pole action substance to the can would be off the point and the negative pole action substance would extrude to the bottom face of the can, the welding heat would be transmitted to the negative pole action substance while welding of external terminal, accordingly internal pressure in the can is increasing and as a result the explosion-proof valve rarely happen to be torn apart.

JP6-68863A showed a measure to deal with such a problem as mentioned above. The measure described in the documents primarily deal with the disruption of explosion-proof valve before it works, in case that the liquid action substance battery happens to fall down in the soldering pot, immediately thereby the battery would be exposed to large amounts of heat with high temperature. However, as a secondly effect, the measure could be against the danger of the disruption of the can while welding of the external terminal, by means of inserting a resin ring such as poly-tetra-fluoro-ethylene, etc. in the bottom of the battery can.

However this measure has some disadvantages as mentioned below. In view of thermal stability and resistance against oxyhalide, fluororesin such as poly-tetra-fluoro-ethylene, etc. are used as a resin ring. But the fluororesin is not preferable because lithium fluoride is formed in the reaction of the fluororesin with lithium used as the negative pole action substance. Moreover, in view of structural and manufactural restriction, the resin ring should be inserted beforehand in the bottom of the battery can before the negative pole action substance is press-bonded to the inner surface of the can. In that case, however, vibration and static electricity generated during transferring process of resin ring after insertion in the battery can, happen to make the resin ring disorder or slant. Therefore said measure is not preferable in view of mass production of the batteries.

The purpose of the invention being made in view of aforementioned circumstances, is to enhance the safety of the liquid action substance battery having its external terminal welded after assembling the battery so as not to be tore apart in the subsequent welding work of the external terminal, even if the position of the negative pole action substance being press-bonded to the inner surface of the battery can would be shifted and that substance would be extruded to the bottom face of the battery can.

SUMMARY OF THE INVENTION

A particular feature of the present invention is that a metal plate is attached to the inner surface of the bottom part of the battery can so as to make a partial space between them in a liquid action substance battery, in which a negative pole action substance and a positive pole action substance are stored and sealed in a bottomed battery can, employing an alkaline metal such as lithium, sodium or potassium or its alloy as the negative pole action substance and oxyhalide such as thionyl chloride, sulfuryl chloride or phosphoryl chloride in a liquid state at normal temperature as the positive pole action substance.

Accordingly, even if the position of the press-bonding of the negative pole action substance would be shifted and thereby the substance would be extruded to the bottom face of the battery can, direct conduction of the welding heat to the negative pole action substance could be prevented, as a result the subsequent welding work of the external terminal could become safer.

In the case mentioned above, in order to make a space between the metal plate and the inner surface of the bottom of the battery can, the metal plate might be beforehand formed into the figure so as to make the space, or the surface of the bottom might be beforehand formed into the figure so as to make the space. By these means, the space between the metal plate and the bottom surface of the can could be certainly kept constant. The space between the metal plate and the battery can is preferably 0.2 mm or more, practically be preferable in the range of 0.3 mm to 0.6 mm. Because if the space is less than 2 mm, welding heat might be conducted to the extruded negative pole action substance in case that the battery can was transformed by the pressing force from a welding rod while welding of external terminal, in other hand if the space would be wider, the inner volume of the battery would be decreased thereby, and it result in decrease of the discharge capacity of the battery.

In addition, in case that an explosion-proof valve system such as cross-like thin plate mounted on the bottom part of the can, is provided to the battery can, an aperture should be formed at the center of the metal plate so as not to interrupt the relieving action of the explosion-proof valve. Accordingly, even if inner pressure in the can might be extraordinary increased, for example, by being heated at high temperature, or by being overcharged, the explosion-proof valve could work so as to immediately relieve the over-pressure, and thereby the risk of tearing apart could be avoided.

When providing the metal plate to the bottom of the battery can, attachment by welding is preferable. The attachment of the metal plate by welding doesn't make any dislocation and thereby it enable the batteries to be handled with ease in the processes of assembling batteries. In addition, even if the battery happens to fall down, the characteristics of the battery were never affected by the dislocation of the metal plate.

DESCRIPTION OF THE REFERENCE NUMERAL

1—battery can, 2—negative pole, 3—porous carbon positive pole, 4—brim paper (glass separator), 5—bottom paper (glass separator), 6—wrapping tube, 7—positive pole current collector, 8—separator, 9—battery cap, 10—glass seal, 11—positive pole terminal, 12—resin seal, 13—lead foil, 14—positive pole action substance doubling as electrolyte, 15—seal, 16—metal plate, 17—negative pole external terminal, 18—positive pole external terminal,

DESCRIPTION OF THE PREFERRED EMBODIMENT

Hereinafter, a liquid action substance battery according to the present invention is described by reference to the drawings.

Example 1

Figure 1:
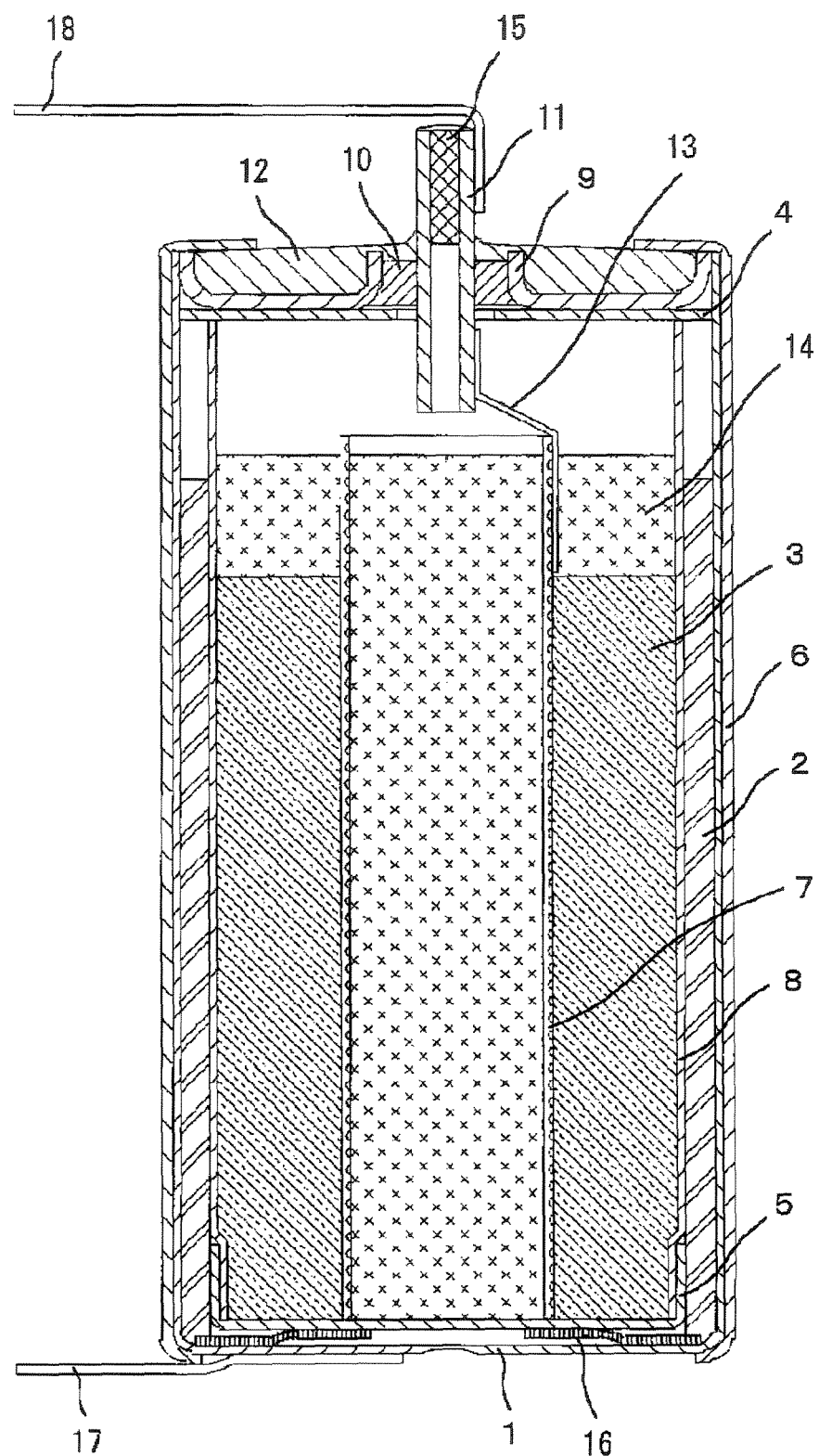
FIG. 1 is a cross-section of the battery of example 1 according to the present invention.
Figure 2:
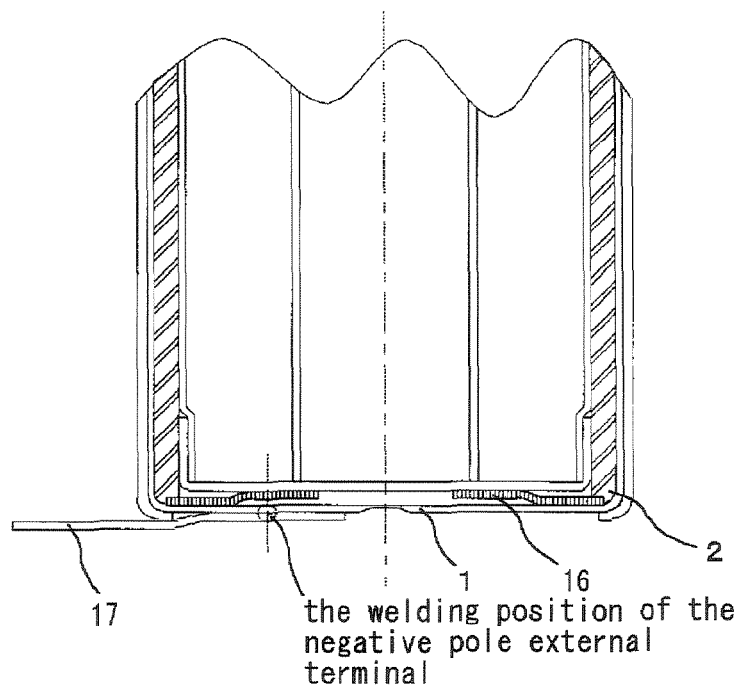
FIG. 2 is an enlarged cross-section of the bottom part of the battery can of FIG. 1.
Figure 3:
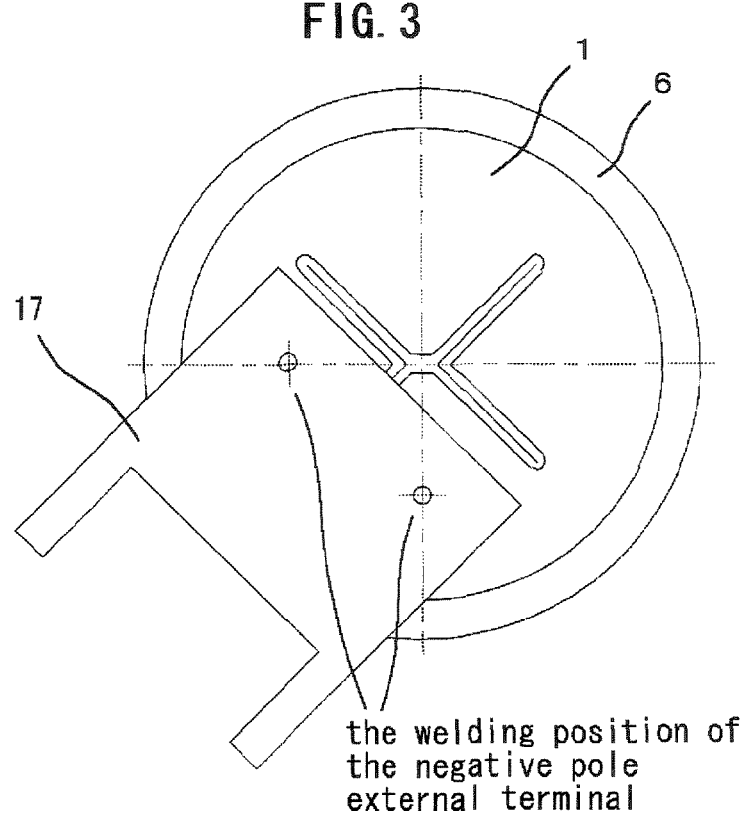
FIG. 3 is a bottom part of the can of the examples of the present invention and that of the comparative examples.

FIG. 1 shows a cross section of the can of example 1 according to the present invention. Also FIG. 1 is a cross section of a ½ AA size of thionyl chloride•lithium battery employing lithium as a negative pole action substance and thionyl chloride as a positive pole action substance. FIG. 2 is enlarged cross-section of the bottom of the battery can of FIG. 1, and FIG. 3 is a bottom part of the can of the examples of the present invention and that of the comparative examples.

In the FIG. 1, reference numeral 1 denotes a battery can made of 14 mm diameter of stainless steel doubled as a negative pole terminal, and an explosion-proof valve, with 8 mm length and 60 μm remained thickness being crosswise stamped, is mounted on the bottom surface of the can. A tubular negative pole 2 made of metal lithium is press-bonded to the inner surface of this battery can. Reference numeral 3 denotes a porous carbon positive pole, which is consisting of acetylene black 45 wt %, furnace black 45 wt % and poly-tetra-fluoro-ethylene 10 wt % being kneaded with liquid mixture of water and ethanol, and being formed of 10 mm diameter and 15 mm height around the positive pole current collector 7, and being vacuum dried during 8 hours at 150° C. The positive pole current collector 7 is made of an expanded metal of nickel by being formed cylindrically.

In the FIG. 1, reference numeral 8 denotes a separator made of glass fiber non-woven fabric, which separates the positive pole and the negative pole. Reference numeral 5 denotes a bottom paper, and 4 denotes a brim paper, and both of them are made of glass fiber non-woven fabric and work as a separator. A battery cap 9 is laser-welded to the upper opening of the battery can. At the center of the battery cap 9, a tubular positive pole terminal 11 is electrically insulated by the glass seal 10. The lower end of the positive pole terminal 11 is electrically connected to the positive pole current collector 7 via a lead foil 13.

The positive pole action substance doubled as an electrolyte injected through tubular positive pole terminal 11, are stored in the can 1. The electrolyte is made by dissolving 1.2 mol of aluminum chloride and 1.2 mol of lithium chloride as electrolyte respectively in thionyl chloride. A seal 15 is inserted in the tubular positive pole terminal 11 and laser-welded thereto.

Reference numeral 12 denotes a resin seal made of epoxy resin, and 6 denotes wrapping tube made of heat-shrinkable film.

In the figures, reference numeral 16 denotes stainless steel metal plate of 0.3 mm thickness, and the plate is attached to the inner surface of the bottom of the battery can 1 by spot-welding in the process prior to the press-bonding process of metal lithium 2 to the battery can 1. The metal plate 16 is like a ring of 12.8 mm outer diameter and 4 mm inner diameter, and a dish-like protrusion of 9 mm φ is made in the center of the metal plate so as to make a space of 0.3 mm between the bottom surface of the can and inner circle of the metal plate. The welding to the battery can is done at the flange of the metal plate. The metal plate is beforehand attached to the battery can by welding, accordingly the metal plate is not dislocated even in the subsequent lithium press-bonding process, and thereby having advantage in view of mass production.

In the figures, reference numeral 17 denotes a negative pole external terminal, which is bonded to the bottom surface of the battery can 1 by spot-welding after assembling the battery. As shown in FIG. 3, the external terminal 17 is welded at a position so as not to make the external terminal 17 overlap with the explosion-proof valve. In describing about the welding position in detail, the center of the welding is located on the circumference of 7 mm φ to the center of the battery, accordingly the heat generated at the welding point of the battery can and the external terminal, is not directly transmitted to the metal ring having the protrusion of 9 mm φ. One thousand of batteries according to the example 1 are assembled.

Example 2

Figure 4:
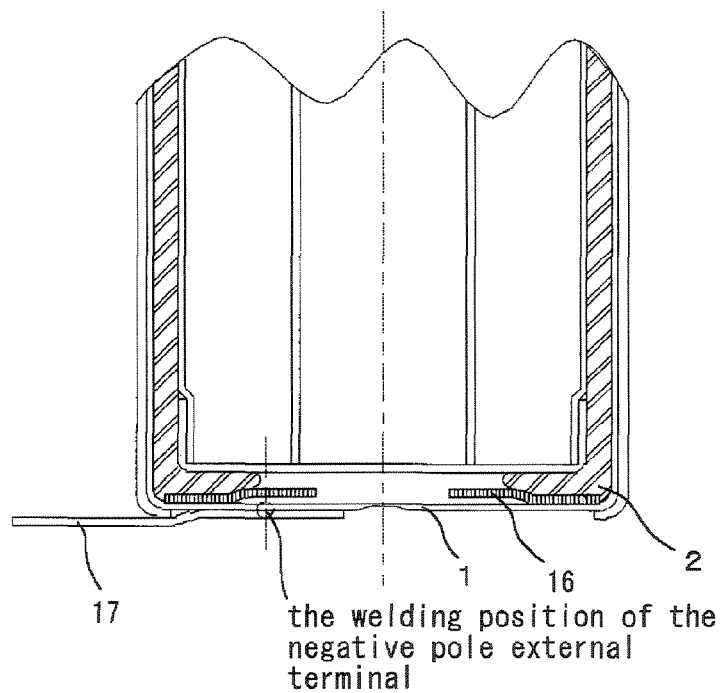
FIG. 4 is an enlarged cross-section of the bottom part of the battery can of example 2 according to the present invention.

By dislocating intentionally the metal lithium 2 toward the bottom surface of the battery can and by press-bonding there, the metal lithium is extruded to the bottom surface of the battery can as shown in the FIG. 4. One thousand of batteries are assembled in the same manner as the example 1 except that mentioned above.

Example 3

Figure 5:
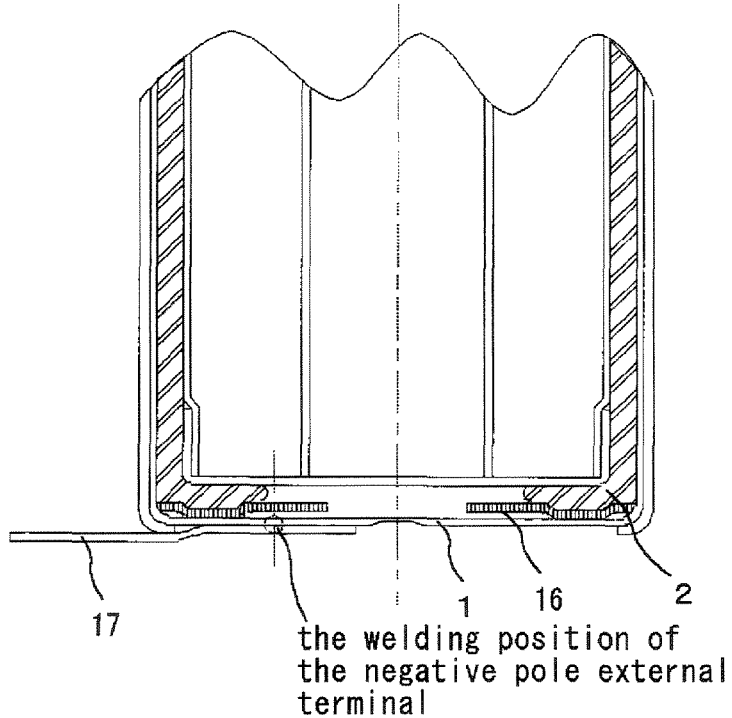
FIG. 5 is an enlarged cross-section of the bottom part of the battery can of example 3 according to the present invention.

The peripheral part of the metal plate is transformed so as to make a protrusion toward the battery can, as shown in the FIG. 5 describing enlarged cross-section of the metal plate. Except it, one thousand of batteries are assembled in the same manner as the example 2. The welding of the battery can with the metal plate is done at the concave of the metal plate.

Example 4

Figure 6:
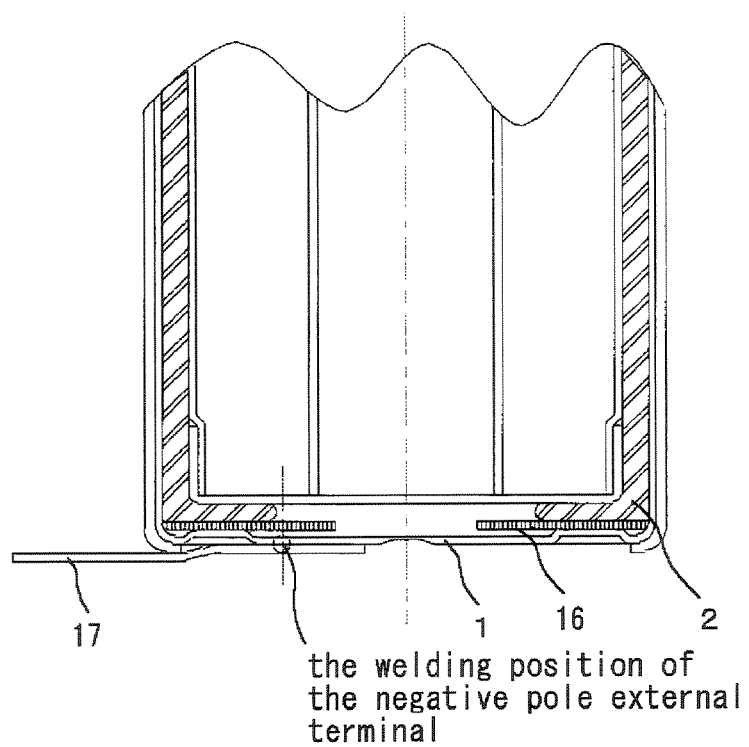
FIG. 6 is an enlarged cross-section of the bottom part of the battery can of example 4 according to the present invention.

The shape of cross-section of the metal plate is made flat and the shape of the bottom of the battery can is made protrudent so as to make a apace between the battery can and the metal plate, as shown in the FIG. 6 describing enlarged cross-section. Except them, one thousand of batteries are assembled in the same manner as the example 2. In this example, the space between the battery can and the metal plate is 0.6 mm and the welding of the battery can with the metal plate is done at the protrusion of the battery can.

Example 5

The diameter of the metal plate having the cross-sectional shape as shown in the FIG. 5 is almost same as the inner diameter, and the metal plate is press-inserted into the bottom part of the battery can. Except them, one thousand of batteries are assembled in the same manner as the example 2.

Comparative Example 1

Figure 7:
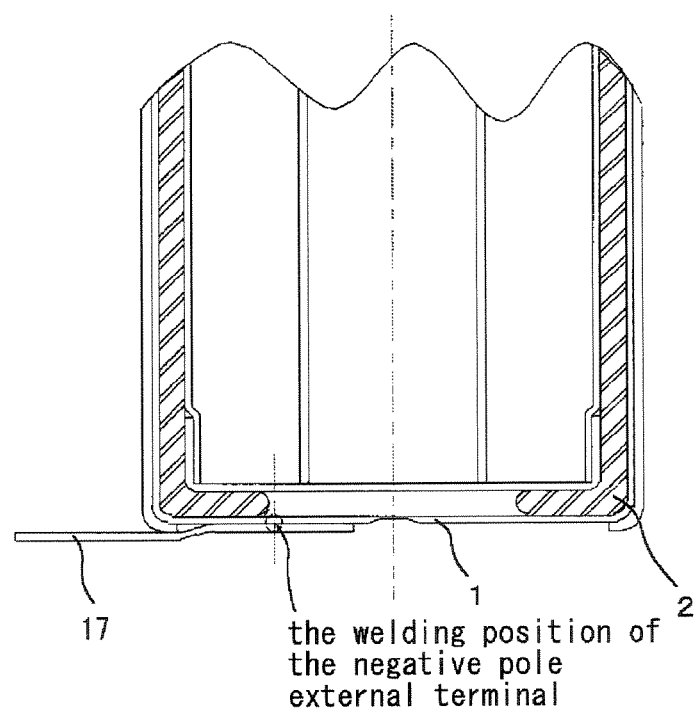
FIG. 7 is an enlarged cross-section of the bottom part of the battery can of comparative example 1.

One thousand of batteries shown in the FIG. 7 describing enlarged cross-section, are assembled in the same manner as the example 2 except not using the metal plate.

Comparative Example 2

Figure 8:
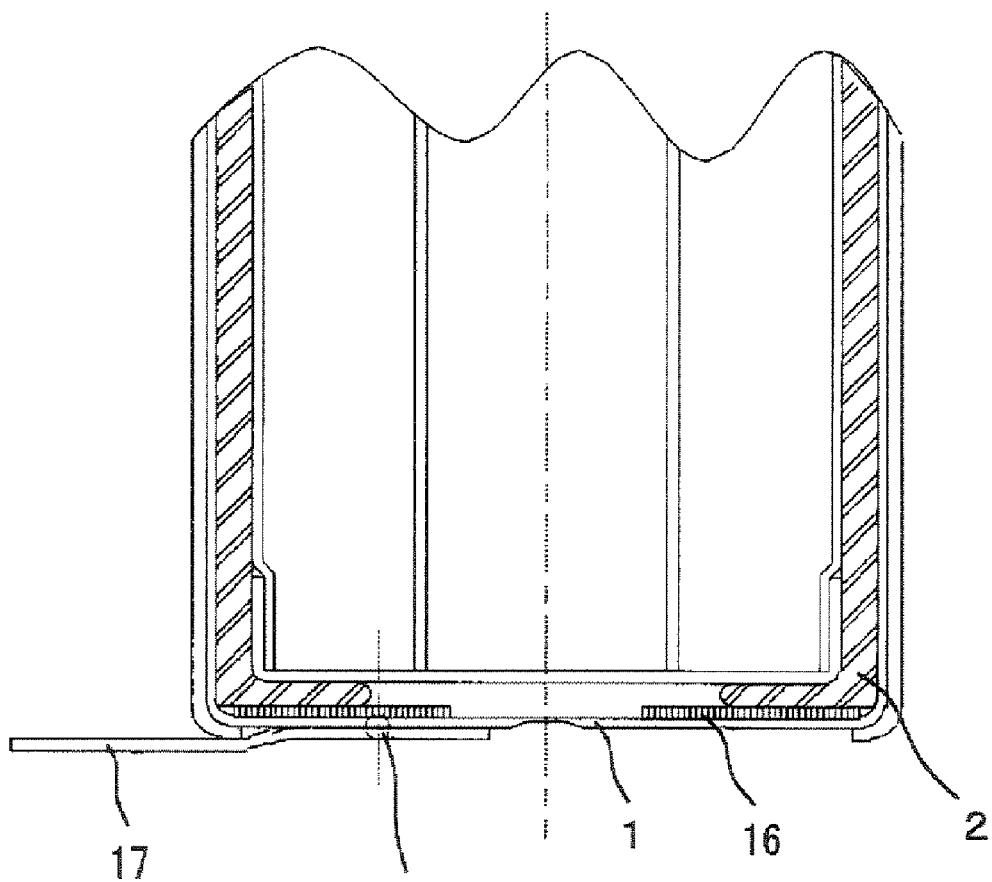
FIG. 8 is an enlarged cross-section of the bottom part of the battery can of comparative example 2.

The shape of the metal plate is made flat, but the space between the metal plate and the bottom surface of the battery can is not made as shown in the FIG. 8 describing enlarged cross-section. Except them, one thousand of batteries are assembled in the same manner as the example 2.

Comparative Example 3

A flat shaped resin plate made of poly-tetra-fluoro-ethylene is used instead of a metal plate. Except it, one thousand of batteries are assembled in the same manner as the comparative example 2.

Table 1 shows the rate of tearing apart of the explosion-proof valve while assembling those batteries.

TABLE 1

|  | The rate of tearing apart(%) |
| --- | --- |
| Example 1 | 0 |
| Example 2 | 0 |
| Example 3 | 0 |
| Example 4 | 0 |
| Example 5 | 0 |
| comparative example 1 | 10.2 |
| comparative example 2 | 3.1 |
| comparative example 3 | 2.2 |

Table 1 clearly shows that the batteries of the example 1 to 5 had no tearing apart. Even if the metal lithium would be extruded to the bottom surface of the battery can while assembling the batteries as shown in the FIG. 2 to 5, the explosion-proof valve was never torn apart while welding of the external terminal, accordingly it being extremely safer. On the other hand, as to the batteries in the comparative example 1 which didn't use the metal plate, and those in the comparative example 2 which used the flat shaped metal plate being attached to the bottom surface of the battery can without making a space, the explosion-proof valves happened to be torn apart. It shows a risk in which the explosion-proof valve is lead to the tearing apart while welding of the external terminal, in case that the position of the press-bonding is dislocated while assembling the batteries in real.

And as to the batteries of the comparative example 3 which used the resin plate instead of the metal plate, the explosion-proof valve happened to be torn apart. According to the investigation of the batteries of which the explosion-proof valves tore apart, the resin plate was dislocated, accordingly they have disadvantage in view of mass production.

INDUSTRIAL APPLICABILITY

As mentioned above, even if the position of a negative pole action substance being press-bonded to the inner surface of the battery can would be shifted and the substance would be extruded to the bottom face of the battery can, a liquid action substance battery according to the present invention enable the subsequent welding work of the terminal to make safe wherein the tearing apart never happens.

What is claimed is:
1. A liquid action substance battery, comprising:
a battery can, comprising a bottom surface comprising an inner face and an outer face;
an annularly shaped metal plate;
an alkaline metal or its alloy as a negative pole action substance; and
an oxyhalide in a liquid state at normal temperature as a positive pole action substance,
wherein the negative pole action substance and the positive pole action substance are stored and sealed in the battery, which is a bottomed battery, and wherein the annularly shaped metal plate mounted to the inner face at the bottom surface of the battery can is preformed so as to have a protrusion in a center part of the annularly shaped metal plate, and thereby form a partial space between the annularly shaped metal plate and the bottom surface of the battery can.

2. A liquid action substance battery, comprising:

a battery can, comprising a bottom surface comprising an inner face and an outer face;

an annularly shaped metal plate;

an alkaline metal or its alloy as a negative pole action substance; and an oxyhalide in a liquid state at normal temperature as a positive pole action substance, wherein the negative pole action substance and the positive pole action substance are stored and sealed in the battery, which is a bottomed battery, and wherein the bottom surface of the battery can is preformed so as to have a protrusion, and thereby form a partial space between the annularly shaped metal plate mounted to the inner face of the bottom surface at a bottom part of the battery can and the bottom surface of the battery can.

\* \* \* \* \*